July 2, 1929.  G. R. METCALF, JR  1,719,301
COVER
Filed April 21, 1927

George R. Metcalf Jr.
INVENTOR
BY
ATTORNEYS.

Patented July 2, 1929.

1,719,301

UNITED STATES PATENT OFFICE.

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA.

COVER.

Application filed April 21, 1927. Serial No. 185,463.

Covers for different receptacles, such as conduit boxes, are preferably provided with screws which are retained in place in the cover so that the securing means may be surely retained with the cover and be available when it is desired to use them and also so that they may assist in holding the screw in proper position for entry in the rather inaccessible places where conduit boxes are usually placed. The present invention is designed to provide a means for accomplishing this purpose. Features and details of the invention will appear from the specification and claims.

A preferable exemplification of the invention is illustrated in the accompanying drawings as follows:—

Figure 1:
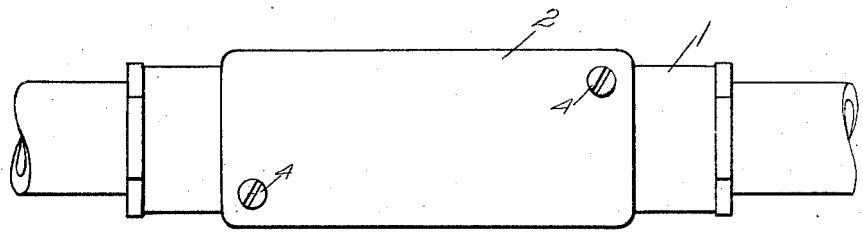

Fig. 1 shows a plan view of a conduit box with the cover in place.

Figure 2:
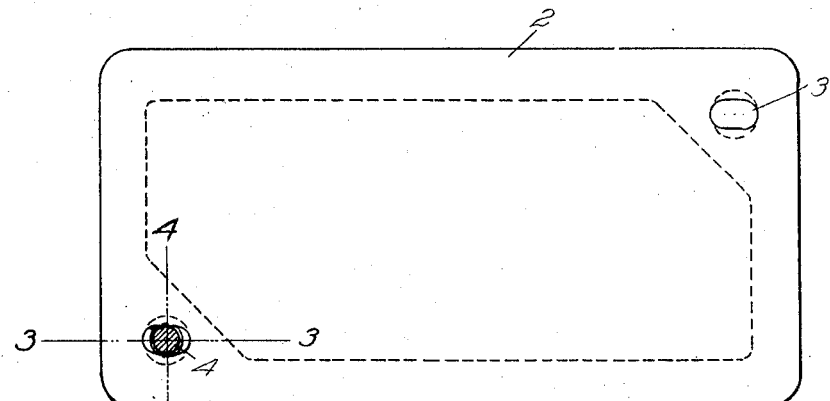

Fig. 2 an enlarged view of the cover and screw, one of the openings of the cover being shown in section.

Figure 3:
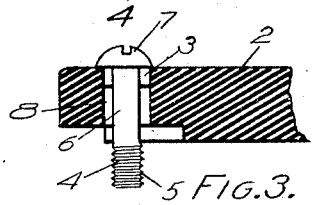

Fig. 3 a section on the line 3—3 in Fig. 2.

Figure 4:
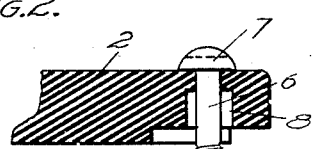

Fig. 4 a section on the line 4—4 in Fig. 2.

Figure 5:
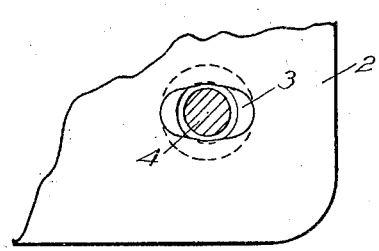

Fig. 5 an enlarged view of a cover corner with the screw opening indicating the screw being forced through the opening.

Figure 6:
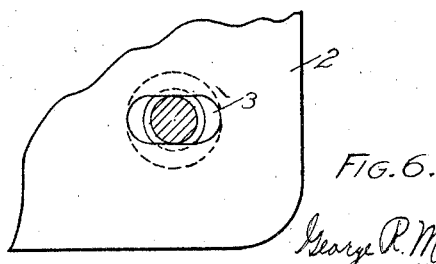

Fig. 6 a similar view with the screw in place.

1 marks a conduit box, and 2 a cover therefor. The cover is provided with oblong openings 3. A screw 4 for securing the cover comprises the screw portion 5, the shank 6, and head 7. The screw portion 5 and head 7 are larger than the smaller dimension of the oblong opening 3. Preferably a socket 8 is arranged on the underside of the cover directly at the opening to reduce the material through which the screw passes.

The invention is particularly desirable in relation to covers of yielding material, such as composition. These are molded with the oblong opening. The screw can then be forced through the opening preferably by turning the screw in the opening. The longer dimension of the opening permits of the springing of the side walls of the material and the more ready entry of the screw through the opening and at the same time the retention of the screw is ample for all practical purposes. Further the oblong opening performs the further and usual function of permitting the adjustment of the screw to slight inequalities of the opening into which the screw is passed with relation to the opening in the cover.

What I claim as new is:—

1. A cover of resilient molded material having an oblong perforation, and a screw extending through the perforation, said screw having a head, a reduced shank next the head and a threaded portion, the shank being in the perforation, and the head and screw portions being larger than the shorter dimension of the perforation.

2. A cover of resilient molded material having an oblong perforation with a socket at the under side of the cover, said socket being larger than the perforation, and a screw extending through the perforation, said screw having a head, a reduced shank next the head, and a threaded portion, the shank being in the perforation and the head and screw portions being larger than the shorter dimension of the perforation.

In testimony whereof I have hereunto set my hand.

GEORGE R. METCALF, JR.